United States Patent
Tenegal et al.

(10) Patent No.: US 8,822,878 B2
(45) Date of Patent: *Sep. 2, 2014

(54) PRODUCTION OF NANOMETRIC OR SUB-MICROMETRIC POWDERS IN CONTINUOUS FLUX

(75) Inventors: Francois Tenegal, Paris (FR); Benoit Guizard, Creteil (FR); Nathalie Herlin-Boime, Orsay (FR); Dominique Porterat, Orsay (FR)

(73) Assignee: Commissariat a l'Energie Atomique, Paris (FR)

(*) Notice: Subject to any disclaimer, the term of this patent is extended or adjusted under 35 U.S.C. 154(b) by 684 days.

This patent is subject to a terminal disclaimer.

(21) Appl. No.: 11/666,846

(22) PCT Filed: Nov. 7, 2005

(86) PCT No.: PCT/FR2005/050929
§ 371 (c)(1),
(2), (4) Date: May 1, 2007

(87) PCT Pub. No.: WO2006/051233
PCT Pub. Date: May 18, 2006

(65) Prior Publication Data
US 2007/0295702 A1 Dec. 27, 2007

(30) Foreign Application Priority Data
Nov. 9, 2004 (FR) .................................... 04 52578

(51) Int. Cl.
*B23K 26/00* (2014.01)
(52) U.S. Cl.
USPC .................................. 219/121.6; 219/121.84

(58) Field of Classification Search
USPC .............. 219/121.6, 121.65, 121.66, 121.84; 506/13; 51/307, 308, 309
See application file for complete search history.

(56) References Cited

U.S. PATENT DOCUMENTS

| | | | |
|---|---|---|---|
| 4,689,129 A | 8/1987 | Knudsen | 204/157.41 |
| 4,772,772 A * | 9/1988 | Juptner et al. | 219/121.83 |
| 4,788,222 A | 11/1988 | Rice et al. | 518/700 |
| 4,895,628 A | 1/1990 | Knudsen et al. | 204/157.41 |
| 5,424,244 A * | 6/1995 | Zhang et al. | 438/301 |
| 5,514,350 A * | 5/1996 | Kear et al. | 422/198 |
| 5,958,348 A * | 9/1999 | Bi et al. | 422/186.04 |
| 6,229,111 B1 * | 5/2001 | McCay et al. | 219/121.59 |

(Continued)

FOREIGN PATENT DOCUMENTS

| | | |
|---|---|---|
| DE | 10163313 A1 | 7/2003 |
| JP | 63224732 | 9/1988 |

OTHER PUBLICATIONS

International Seach Report, PCT/FR2005/050929, 2 pgs, (Mar. 13, 2006).

*Primary Examiner* — John Wasaff
(74) *Attorney, Agent, or Firm* — Nixon Peabody LLP

(57) ABSTRACT

A system and process for production of nanometric or submicrometric powders in continuous flux under the action of laser pyrolysis in at least one interaction zone between a beam emitted by a laser and a flux of reagents emitted by an injector, in which the laser is followed by optical means for distributing the energy of the beam emitted by the latter according to an axis perpendicular to the axis of each flux of reagents, in an elongated cross-section having adjustable dimensions at the level of this at least one interaction zone.

10 Claims, 2 Drawing Sheets

(56) References Cited

U.S. PATENT DOCUMENTS

Figure 1:
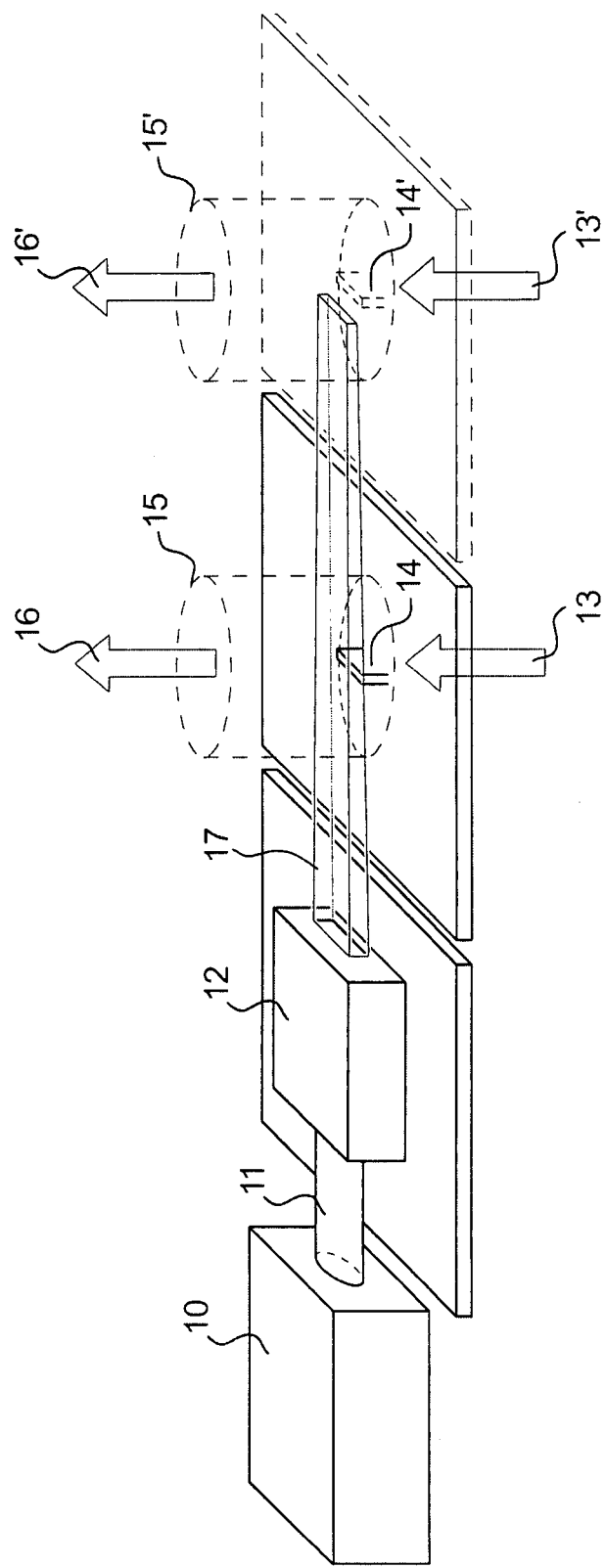

| | | |
|---|---|---|
| 6,248,216 B1 * | 6/2001 | Bi et al. .................. 204/157.15 |
| 6,254,928 B1 * | 7/2001 | Doan ............................ 427/212 |
| 2001/0045063 A1 | 11/2001 | Kambe et al. .................. 51/308 |
| 2003/0157867 A1 * | 8/2003 | Doan .............................. 451/36 |
| 2003/0166379 A1 | 9/2003 | Doan .............................. 451/36 |
| 2008/0070801 A1 * | 3/2008 | Xiang et al. .................... 506/13 |
| 2008/0305257 A1 * | 12/2008 | Tenegal et al. ................ 427/217 |

* cited by examiner

PRODUCTION OF NANOMETRIC OR SUB-MICROMETRIC POWDERS IN CONTINUOUS FLUX

CROSS REFERENCE TO RELATED APPLICATIONS OR PRIORITY CLAIM

This application is a national phase of International Application No. PCT/FR2005/050929 entitled "System And Method For Continuous Flow Production Of Nanometric Or Sub-Micrometric Powders By The Action Of A Pyrolytic Laser", which was filed on Nov. 7, 2005, which was not published in English, and which claims priority of the French Patent Application Nos. 04 52578 filed Nov. 9, 2004.

TECHNICAL FIELD

The present invention relates to a system and a process for production of nanometric or sub-micrometric powders in continuous flux under the action of a laser pyrolysis.

PRIOR ART

In the field of dense materials manufactured by metallurgy of powders, properties of resistance to breakage, hardness, resistance to wear, for mechanical and thermomechanical applications, tend to improve to the extent that the size of the powder grains decreases. When this size reaches the nanometric domain (1 to 100 nanometers) these properties can develop strongly, and a good aptitude to flow can be observed, with possible superplasticity (a polycrystalline material is qualified as superplastic when it can support deformation in traction of more than 100% without manifesting any contraction) in the case of $ZrO_2$, SiC, nanocomposites $Si_3N_4$/Sic, and Cu. The flow aptitude considers, for example, the hot-forming of ceramics by avoiding the stages of machining. But the processes of manufacturing materials utilising nanometric powders are still not well managed due to the specific characteristics of these powders (reactivity, agglomeration . . . ), their availability and their cost. With respect to non-oxidised nanometric powders protection from oxidation, which can be necessary, can prove to be dangerous (pyrophoric effects). Coating the grains in organic or mineral materials is therefore preferable.

In the field of catalysis for the processing of effluents, oxidised nanometric powders doped by metals (for catalysis) produce deposits with increased catalytic activity, on condition of obtaining good dispersion of the active phases on the surface of these powders.

In the field of cosmetics the use of powders in $TiO_2$ or in ZnO in formulations, aids in boosting protection in the ultraviolet range. The use of photochromic nanometric powders also allows the emergence of novel coloured products.

In the field of flat screen devices the use of nanometric powders creates strongly luminescent deposits of adjustable wavelength (P doped ZnO or ZnS, Si).

In the field of energy storage the use of composite oxidised nanometric powders for manufacturing lithium battery electrodes increases the capacities of energy storage.

In these different fields the use of nanometric (5-100 nanometers) or sub-micrometric (100-500 nanometers) powders thus produces remarkable improvements in properties.

Numerous methods of synthesis of such powders exist, especially laser pyrolysis in flux. This method is based on the interaction between the emission of a $CO_2$ power laser and a flux of reagents constituted by gas, liquid in the form of aerosols or a mixture of both, such that the chemical composition of the powder can be multi-element. The speed of passage of the reagents in the laser beam helps controls the size of the powders. The flux of reagents absorbs the energy of the laser beam, which results in decomposition of the reagent molecules then formation of particles by homogeneous germination and growth in a flame. The growth of the particles is blocked by a quenching effect. This method is a flexible method of implementation allowing synthesis of various nanometric powders carbide, oxide or nitride type with high yields. It is also adapted to synthesis of composite powders such as Si/C/N or even Si/C/B powders.

A document of the known art, patent application WO 98/37961, describes a device for mass synthesis of such powders, by laser pyrolysis in flux by elongating the cross-section of the injectors of reagents along the major axis of the laser beam. This device comprises a reaction chamber with a window for introducing the laser beam and an elongated opening of the injectors. In this device radial focussing by lens causes augmentation in power density at the focal point but also a reduction in hourly production rates because the cross-section of the injectors must be reduced relative to the non-focussed case. This device makes abstraction of the parameter power density which is a key parameter including the structure, composition, size of powder grains as well as yields. This device does not ensure large-scale production of powders requiring the use of large power densities. Extrapolation of the hourly production rates is thus carried out to the detriment of possible adjustment of the characteristics of the powders. Also, the cross-section of the injectors cannot be elongated too significantly in the axis of the laser beam. In fact, to the extent where the reagent flux is penetrated by the laser, there is progressive absorption of the energy until the remaining energy is no longer adequate. Since the pyrolysis reaction is a reaction with threshold effect, there is a moment when the incident energy per square centimeter becomes too weak to initiate the synthesis reaction. In addition, the decrease in the quantity of energy absorbed while the flux of reagents has penetrated can be such as to induce modifications in structure, size and composition of the powder formed in the same batch, all the more so since the incident laser power is high.

The object of the invention is to eliminate these disadvantages by enabling, by mass synthesis of nanometric or sub-micrometric powders based on the principle of laser pyrolysis in flux, more than 500 grams per hour of such powders in continuous flux to be produced at low cost.

EXPLANATION OF THE INVENTION

The invention relates to a system for production of nanometric or sub-micrometric powders in continuous flux under the action of laser pyrolysis in at least one interaction zone between a beam emitted by a laser and a flux of reagents emitted by an injector, characterised in that the laser is followed by optical means for distributing the energy of the beam emitted by the latter according to an axis perpendicular to the axis of each flux of reagents in an elongated cross-section, for example rectangular, having adjustable dimensions at the level of this at least one interaction zone.

Advantageously the power density of the beam is identical prior to reaching each interaction zone at each injector of a set of several injectors.

The invention also concerns a process for production of nanometric or sub-micrometric powders in continuous flux under the action of laser pyrolysis by interaction between a beam emitted by a laser and a flux of reagents emitted by at least one injector, characterised in that the energy of the beam is distributed according to an axis perpendicular to the axis of the flux of reagents in an elongated cross-section, for example rectangular, having adjustable dimensions at the level of at least one interaction zone between this beam and a flux of reagents emitted by an injector.

Advantageously, the loss is compensated by absorption of power density of this beam in an interaction zone at the level of an injector of set of several injectors by concentration of the energy flow in the following interaction zone.

The process of the invention ensures production of large quantities (greater than 500 grams/hour) of nanometric (5-100 nanometers) or sub-micrometric (100-500 nanometers) powders in continuous flux. The process of the invention favours hourly production rate and consumes almost all (over 90%) of the laser energy. It also produces powders having the same characteristics (chemical composition, structure, size, yields) as they leave the different interaction zones. Finally, it produces powders with chemical yields close to 100%.

The process of the invention changes the incident power density, as a function of the desired characteristics of the powder, by modifying the position of the injectors along the axis of the laser beam or by modulating the power as it leaves the laser.

BRIEF DESCRIPTION OF THE DIAGRAMS

Figure 2:
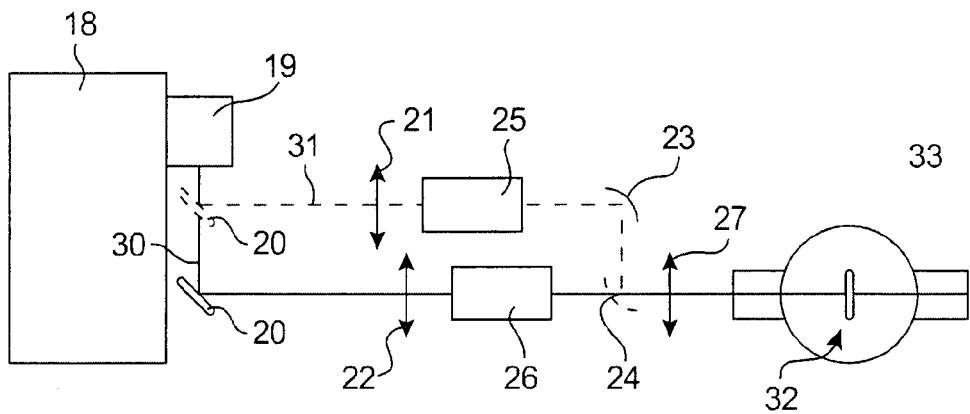
Figure 3:
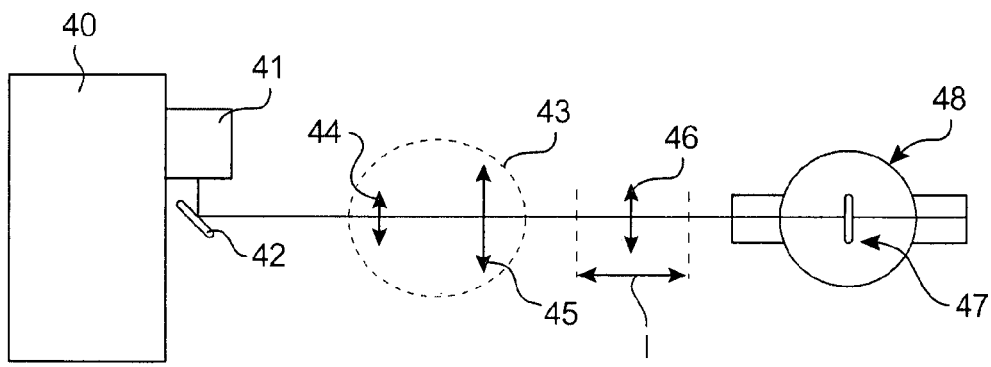
Figure 4:
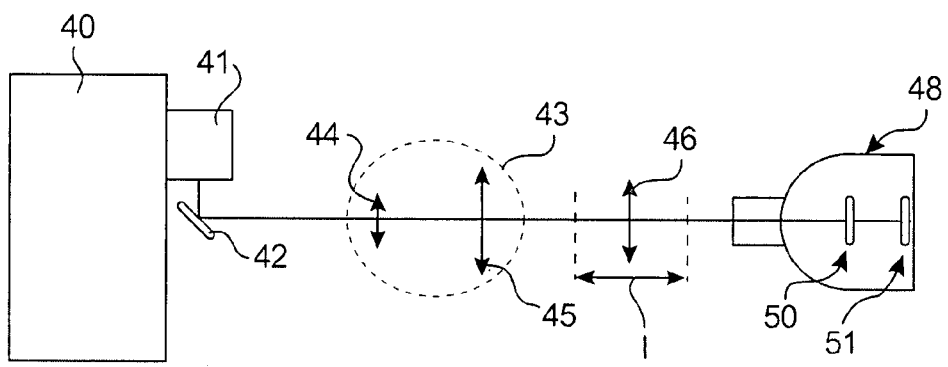

FIG. 1 schematically illustrates the system of the invention.
FIGS. 2 to 4 illustrate three embodiments of the system of the invention.

DETAILED EXPLANATION OF PARTICULAR EMBODIMENTS

As shown in FIG. 1, the system of the invention comprises a laser 10, which delivers a beam 11, followed by an optical device 12 for distributing at 17 the beam energy, according to an axis perpendicular to the axis of a flux of reagents 13, in an elongated cross-section, for example rectangular, having adjustable dimensions at the level of at least one interaction zone 15 between this beam and this flux of reagents 13 emitted by at least an injector 14, the production of powders being referenced as 16.

Shaping the laser beam in elongated form, for example rectangular, favours strong hourly production rates for powders having an adjustable size, composition and structure. The energy of the beam can thus be distributed over a rectangular or elliptical cross-section whereof the width or height can be changed independently.

The adjustment of the power density allowed by such forming enables powders to be formed having sizes capable of exceeding 10 nanometers and approaching 500 nanometers. The enlargement of the grains can also be achieved by sharply reducing the reagent rates.

Advantageously, the energy of the laser beam can be absorbed in several successive interaction zones 15, 15' until the energy of the laser beam is fully absorbed. The parameter power density is then kept identical in all the interaction zones, by compensating for the loss by absorption in any given zone N−1 by concentration of the energy flux in the following zone N. Almost all of the energy flow for producing the nanometric powders, the interaction zones 15, 15' producing fewer and fewer powders is this absorbed with the advance of the route of the beam. A maximum energy yield is thus obtained.

The process of the invention therefore offers numerous advantages relative to the process, analysed hereinabove, described in the patent application WO 983796, especially:

an increase in hourly production rates is obtained by lateral extension of the injection cross-section of the reagents.
elongated shaping, for example rectangular, of the laser beam significantly boosts hourly production rates over a wide range of power density.
the emission cross-section of the reagents of the injectors can be kept constant over a wider range of power density.

Three embodiments of the system of the invention will now be considered hereinbelow.

Example 1

Production of Nanometric SiC Powders by Using a 5 kW Laser

In this first example, as shown in FIG. 2 in a plan view, the system of the invention comprises a 5 kw $CO_2$ laser 18 emitting at 10.6 µm and having a 17 mm cross-section, a periscope 19, a flat mirror 20, spherical lenses 21, 22 and 27, spherical mirrors 23 and 24 and two kaleidoscopes 25 and 26. Two possible embodiments, corresponding to two routes 30 and 31 of the laser beam are possible. The first route 30 creates a beam cross-section of 50 mm in width and 10 mm in height. The beam is first reflected by the flat mirror 20 then passes through the spherical lens 22, the kaleidoscope 26 and the spherical lens 27. The second route 31 corresponds to a beam cross-section of width 50 mm and height 300 µm. The beam is first reflected by the flat mirror 20, the position of which is changed relative to the previous mode, then it passes through the spherical lens 21, the kaleidoscope 25, and is reflected by the spherical mirrors 23 and 24, the latter mirror having been added, then passes through the spherical lens 27.

At the level of the interaction zone 32 with the flux of reagents (synthesis zone) emitted by the injector, in the reactor 33, the power is distributed over a rectangle of width of 50 mm and height of 10 mm or 300 µm. This therefore gives the capacity to produce nanometric powders in bulk and to modify the incident power density by a factor greater than 30 without influencing hourly production rates.

In the first embodiment this device ensures more than 750 $W/cm^2$ at the level of the interaction zone with the flux of reagents. The elongated injector according to an axis perpendicular to the axis of the laser beam, for example 4 cm wide by 2 mm deep, ensures production greater than 1 kilogram per hour of nanometric SiC powders.

In the second embodiment, this device ensures more than 25000 $W/cm^2$ at the level of the interaction zone with the flux of reagents. An elongated injector according to an axis perpendicular to the axis of the laser beam, for example 4 cm wide by 2 mm deep, ensures production greater than 1 kilogram per hour of nanometric SiC powders.

The second embodiment forms more crystallised SiC powders (in terms of number and size crystals) than the first without modification of hourly production rates, the rate and speed of the reagents remaining unchanged.

Example 2

Production of Nanometric SiC Powders from a Mixture of Silane ($SiH_4$) and Acethylene ($C_2H_2$) by Using a 1 kW Laser As shown in FIG. 3, the system of the invention comprises an laser 40, a periscope 41, a flat mirror 42, an afocal 43 and a cylindrical lens 46. The afocal 43 helps to enlarge the size of the beam to the desired dimension in width at the level of the interaction zone with the flux of reagents. It can be composed of two convergent cylindrical lenses 44 and 45, its magnification being supplied by the ratio of the focal distances of these lenses.

Once the cross-section of the beam is magnified, the cylindrical lens 46 focuses the beam at the level of the interaction zone 47 with the flux of reagents in the reactor 48. The width in cross-section of the beam is defined by the afocal. By varying the position of the lens over a length l, the height in cross-section of the beam can be varied at the level of the synthesis zone (when viewed more or less far from the focal point). As a consequence more or less power is concentrated on the flow of reagents hence the variation in power density, as required.

By describing a rotation of 90° of the lens 46 about the optical axis a very elongated patch can be obtained vertically, which increases the dwell time of the reagents in the flame.

Example 3

Production of Nanometric SiC Powders from a Mixture of Silane ($SiH_4$) and Acethylene ($C_2H_2$) by Using a 5 kW Laser This example corresponds to the previous example applied to a multi-zone system 50 and 51 illustrated in FIG. 4. Several reagent injectors consume maximum power for synthesis. In this case, the losses by absorption are compensated by the concentration of the beam and it is simply a matter of positioning the injectors such that the incident power density is identical to the entry of the reagent beam from one injector to the other. In the previous example, as it leaves the lens 46, the beam converges. By placing a first injector in front of the focal point, other injectors can be placed one after another. The parameter defining the positioning of the injectors relative to one another is thus the power density. This is the ratio of the incident power on the surface of the cross-section of the beam. The preferred value for this parameter depends on the nature of powders formed and the preferred characteristics, but it must be the same at the entry of all the interaction zones. In fact, at each zone energy is lost from absorption and concentration of the beam along the axis compensates for losses and recovers the preferred power at the following zone.

The table below illustrates the results obtained.

| Interaction zone | Power at the zone entry ($kW/cm^2$) | Section of the beam ($cm^2$) | Average power density ($kW/cm^2$) | Section of injectors ($cm^2$) | Reagent rates (l/min.) $SiH_4$ | Reagent rates (l/min.) $C_2H_2$ | Absorbed power (W) | Production rate (kg/h) |
|---|---|---|---|---|---|---|---|---|
| 1 | 4300 | 4 | 1.07 | 1 | 14 | 7 | 2100 | 1.75 |
| 2 | 2200 | 2 | 1.05 | 1 | 14 | 7 | 2100 | 1.75 |
| total | Rest 100 W | | | | | | 4200 W | 3.5 kg/h | with ×3 magnification (beam width of 51 mm).

The power density utilised is 1000 $W/cm^2$ (for each of the zones). The reaction yield is 100%.

The energy utilised to form a gram of powder is 1.23 W/g (4300 W/3.5 kg), a value close to the useful energy for producing a gram which is 1.2 W/g. The energy of the laser beam is consumed at 85% for the production of nanometric powders.

The invention claimed is:

1. A system for production of nanometric or sub-micrometric powders in continuous flux under the action of laser pyrolysis, the system comprising:
    a laser emitting a laser beam along a first axis;
    means for focusing the laser beam at a focal point;
    a first injector downstream from the laser and from the means for focusing and configured to emit a first flux of reagents along a second axis perpendicular to the first axis in a first interaction zone;
    a second injector positioned downstream of the first injector, the second injector configured to emit a second flux of reagents along a third axis perpendicular to the first axis in a second interaction zone;
    means for distributing energy of the laser beam into an elongated cross-section, the elongated cross-section having at least one adjustable width or height dimension that can be changed independently, wherein the laser beam interacts with the first flux of reagents in the first interaction zone and interacts with the second flux of reagents in the second interaction zone to produce powders,
    wherein the power density of the laser beam is identical prior to reaching each interaction zone at the level of each injector of a plurality of injectors and is equal to a preferred power density, and
    wherein the first injector is placed in front of the focal point and the second injector is placed after the first injector, such that the concentration of the laser beam along the first axis compensates for losses from absorption in the first interaction zone and recovers the preferred power density at the second interaction zone.

2. The system as claimed in claim 1, in which the elongated cross-section is rectangular.

3. A process for production of nanometric or sub-micrometric powders in continuous flux under the action of a laser pyrolysis, the process comprising:
    emitting a laser beam from a laser and distributing the laser beam along a first axis;
    at position A, focusing the laser beam at a focal point located at position B;
    emitting a first flux of reagent from a first injector downstream from position A along a second axis perpendicular to the first axis;
    emitting a second flux of reagent from a second injector downstream of the first injector, the second flux of reagent emitted along a third axis perpendicular to the first axis;
    wherein the laser beam is distributed in an elongated cross-section and has at least one adjustable width or height dimension that can be changed independently at the level of each of the interaction zones so that energy of the laser beam is absorbed in the interaction zones;
    wherein the power density of the laser beam is identical prior to reaching each interaction zone at the level of each injector of a plurality of injectors and is equal to a preferred power density; and wherein the first injector and the second injector are placed between position A and position B and the second injector is placed downstream of the first injector, such that the concentration of the laser beam along the first axis compensates for losses from absorption in the first interaction zone and recovers the preferred power density at the second interaction zone.

4. The process as claimed in claim 3, in which the elongated cross-section is a rectangular cross-section.

5. The process as claimed in claim 3, in which a loss in power density of the laser beam is compensated by absorption in the interaction zones at the level of the injectors by concentration of the energy flow in a following interaction zone.

6. The system as claimed in claim 1, wherein the at least two interaction zones are oriented successively and in line with the laser beam.

7. The process as claimed in claim 3, wherein the at least two interaction zones are oriented successively and in line with the laser beam.

8. The system of claim 1, wherein the at least one adjustable dimension is an adjustable height dimension.

9. The system of claim 1, wherein the at least one adjustable dimension is an adjustable width dimension.

10. The system of claim 1, wherein the energy of the laser beam is adjusted to form powders having sizes greater than 100 nanometers and up to and including 500 nanometers.

* * * * *